US008511535B1

(12) United States Patent
Yang et al.

(10) Patent No.: US 8,511,535 B1
(45) Date of Patent: Aug. 20, 2013

(54) INNOVATIVE BRAZE AND BRAZING PROCESS FOR HERMETIC SEALING BETWEEN CERAMIC AND METAL COMPONENTS IN A HIGH-TEMPERATURE OXIDIZING OR REDUCING ATMOSPHERE

(75) Inventors: Quan Yang, San Diego, CA (US); Chunhu Tan, Irvine, CA (US); Zhigang Lin, Irvine, CA (US)

(73) Assignee: Aegis Technology Inc., Santa Ana, CA (US)

( * ) Notice: Subject to any disclaimer, the term of this patent is extended or adjusted under 35 U.S.C. 154(b) by 0 days.

(21) Appl. No.: 12/763,007

(22) Filed: Apr. 19, 2010

(51) Int. Cl.
*B23K 31/02* (2006.01)

(52) U.S. Cl.
USPC ...... 228/121; 228/122.1; 228/246; 228/248.1

(58) Field of Classification Search
None
See application file for complete search history.

(56) References Cited

U.S. PATENT DOCUMENTS

| | | | | |
|---|---|---|---|---|
| 3,845,545 | A | | 11/1974 | Surrall et al. |
| 4,277,458 | A | * | 7/1981 | Sugier et al. ............... 423/437.1 |
| 4,478,641 | A | * | 10/1984 | Adair et al. ...................... 501/72 |
| 4,479,902 | A | * | 10/1984 | Rosen ........................... 554/145 |
| 4,797,182 | A | * | 1/1989 | Beer et al. ........................ 205/80 |
| 5,016,809 | A | | 5/1991 | Winterbottom et al. |
| 5,139,739 | A | * | 8/1992 | Takayanagi et al. .......... 420/507 |
| 5,250,229 | A | * | 10/1993 | Hara et al. ................ 252/519.54 |
| 5,473,304 | A | * | 12/1995 | Friese et al. ..................... 338/23 |
| 5,571,612 | A | * | 11/1996 | Motohiro et al. ............. 428/323 |
| 5,879,794 | A | * | 3/1999 | Korleski, Jr. ............... 428/317.1 |
| 6,177,382 | B1 | * | 1/2001 | Hesse et al. ................... 502/439 |
| 6,319,617 | B1 | * | 11/2001 | Jin et al. ......................... 428/469 |
| 6,604,276 | B2 | * | 8/2003 | Jeong et al. ................... 29/610.1 |
| 6,606,856 | B1 | * | 8/2003 | Brown et al. ................... 60/299 |
| 6,743,404 | B1 | * | 6/2004 | Schumacher et al. ...... 423/239.1 |
| 6,843,406 | B2 | | 1/2005 | Yang et al. |
| 6,940,628 | B2 | * | 9/2005 | Giron ............................ 359/265 |
| 7,055,733 | B2 | | 6/2006 | Weil et al. |
| 7,344,675 | B2 | | 3/2008 | Van Daam et al. |
| 2003/0132270 | A1 | * | 7/2003 | Weil et al. .................. 228/122.1 |

(Continued)

FOREIGN PATENT DOCUMENTS

DE 102008013876 A * 9/2009
GB 1129951 10/1968

(Continued)

OTHER PUBLICATIONS

Kim JYY, JS Hardy, and KS Weil. 2005. "Novel Metal-Ceramic Joining for Planar SOFCs" Jouranl of the Electrochemical Society 152(6): J52-J58.*

(Continued)

*Primary Examiner* — Kiley Stoner
(74) *Attorney, Agent, or Firm* — Cascio & Zervas

(57) ABSTRACT

A superior braze material, along with a method of producing the braze material and a method of sealing, joining or bonding materials through brazing is disclosed. The braze material is based on a metal oxide-noble metal mixture, typically Ag—CuO, with the addition of a small amount of metal oxide and/or metal such as $TiO_2$, $Al_2O_3$, YSZ, Al, and Pd that will further improve wettability and joint strength. Braze filer materials, typically either in the form of paste or thin foil, may be prepared by a high-energy cryogenic ball milling process. This process allows the braze material to form at a finer size, thereby allowing more evenly dispersed braze particles in the resultant braze layer between on the surface of the ceramic substrate and metallic parts.

12 Claims, 4 Drawing Sheets

(56) References Cited

U.S. PATENT DOCUMENTS

| | | |
|---|---|---|
| 2004/0060967 A1 | 4/2004 | Yang et al. |
| 2006/0239765 A1* | 10/2006 | Weil et al. ............. 403/50 |
| 2008/0217382 A1 | 9/2008 | Kim et al. |
| 2008/0305356 A1 | 12/2008 | Weil et al. |
| 2009/0016953 A1 | 1/2009 | Weil et al. |

FOREIGN PATENT DOCUMENTS

| | | |
|---|---|---|
| GB | 1270477 | 12/1972 |
| GB | 1342323 | 1/1974 |
| JP | 60-013038 A * | 1/1985 |
| JP | 01-076988 A * | 3/1998 |
| WO | WO99/65642 | 12/1999 |
| WO | WO01/24962 | 4/2001 |
| WO | WO2004/030121 | 4/2004 |

OTHER PUBLICATIONS

KS Weil, Kim JYY, and JS Hardy. 2005. "reactive Air Brazing: A Novel Method of Sealing SOFCs and Other Slid-State Electrochemical Devices" Electrochemical and Solid-State Letters 8(2): A133-A136.*

E.J. Pavlina, A.M. Meier, P. Monteleone, J.D. Weigner. 2006. "Development of silver-metal oxide reactive air braze alloys for electroding PZT ceramics" J Mater Sci 42:705-713.*

* cited by examiner (a)

(b)

(a)

(b)

INNOVATIVE BRAZE AND BRAZING PROCESS FOR HERMETIC SEALING BETWEEN CERAMIC AND METAL COMPONENTS IN A HIGH-TEMPERATURE OXIDIZING OR REDUCING ATMOSPHERE

STATEMENT REGARDING FEDERALLY SPONSORED RESEARCH OR DEVELOPMENT

Certain work described herein was supported by SBIR grant no. DE-FG02-07ER84934. The Government may have certain rights in this invention.

BACKGROUND OF THE INVENTION (1) Field of Technology

This technology relates to a bonding, sealing or joining technology, and more particularly to a method and apparatus suitable for brazing two materials together.

(2) Description of Related Art Including Information Disclosed Under 37 CFR 1.97 and 1.98

A hermetic seal, joint or bond to create a hermetic enclosure is a requirement of many microelectronic systems and high temperature electrochemical devices. For example, semiconductor lasers, oxygen generators, gas separation devices, fuel cells, chemical sensors and other microelectronic systems require metal and ceramic components to be hermetically bonded, joined or sealed to each other. Development of effective seals, joints and bonds has been one of the most critical areas of study for improving the performance of these devices.

However, creating the required air-tight or hermetic environment through a hermetic seal presents many challenges. The properties of the ceramics and metals themselves present the bulk of the problems. For example, hermetically sealing metal and ceramic components is a major issue in the design and manufacture of solid oxide fuel cell (SOFC) stacks. The strength of the seal may be tested in certain applications through exposure to an oxidizing and/or reducing atmosphere, operating temperatures of 450-850° C. and be subjected to thermal cycles. The device and specifically the seal must maintain its hermeticity along with its chemical and mechanical properties over typically several thousand hours or the lifetime of the device.

There are currently a number of accepted methods of creating a hermetic seal. However, all of them have disadvantages. For example in regards to SOFCs, particularly Planar Solid Oxide Fuel Cells (pSOFCs), Glass Joining (GJ), is commonly used when compared to other techniques. However, the seal is particularly susceptible to fracture when exposed to tensile stresses and is otherwise brittle, and nonyielding. Thermal expansion mismatch between glass and joining substrates is often encountered during nonequilibrium thermal events such as rapid stack heating or cooling.

Active Metal Brazing (AMB) is a popular method in joining ceramic-to-metal surfaces. AMB encourages wetting between the ceramic faying surface and the braze by utilizing a reactive element such as titanium. However, AMB presents at least two major problems for sealing solid-state electrochemical devices. (i) rapid deterioration of the joint at the ceramic-braze metal interface and an eventual loss of hermeticity due to the complete oxidization of the active species in the braze in high temperature operation, and (ii) the complex oxide materials in these devices are adversely affected by the typical processing conditions in AMB, namely exposure of the entire device to a reducing atmosphere greater than ~800° C.

A relatively recent development, Reactive Air Brazing (RAB) is promising, although it has some disadvantages. RAB's distinct advantage is that the brazing may be directly conducted in an oxidizing atmosphere, typically in air at an elevated brazing temperature. The traditional braze material in RAB is a metal oxide-noble metal mixture. RAB produces a seal between a metal and ceramic part resistant to oxidization even at high temperatures. Although RAB has demonstrated some encouraging results, improvements addressing the design and preparation of the braze still need to be realized. For example, the presence of a continuous phase of CuO either within the interior of the braze, or along the braze/alumina interface is deleterious to the strength of the joint. Also, the wettability and bonding strength of the seal under traditional RAB is still relatively limited.

Thus, there exists a need for new methods of forming seals by advancing RAB technology through a novel material composition design and/or material processing to overcome these difficulties and produce metal to ceramic seals which function well in demanding conditions. The resulting development or invention of more advanced RAB is expected to provide a reliable high-temperature sealing, joining or bonding technology.

All referenced patents, applications and literatures are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply. The invention may seek to satisfy one or more of the above-mentioned desire. Although the present invention may obviate one or more of the above-mentioned desires, it should be understood that some aspects of the invention might not necessarily obviate them.

BRIEF SUMMARY OF THE INVENTION

Accordingly, it is an object of the present invention to provide an improved braze method of manufacture and process for brazing for RAB technologies.

It is a further object of the present invention to utilize a braze material based on a metal oxide-noble metal mixture with an additive, which is an addition of a certain amount of one or several metals, one or several metal oxides or a combination of both metals and metal oxides.

It is a further object of the present invention to develop a method of brazing or to prepare a braze material by a high-energy ball milling (e.g. cryomilling) process to form a finer size, more evenly dispersed particles on the surface of the substrate.

One embodiment of the present invention is a brazing material for brazing a first material to a second material together. This material may be selected as a metal oxide-noble metal mixture, typically Ag—CuO, but may also be Ag—$V_2O_5$ or Pt—$Nb_2O_5$. Additives comprising an addition of at least one metal oxide, such as $TiO_2$, YSZ and $Al_2O_3$, or at least one metal, such as Al and Pd, or at least one of both a metal oxide as well as at least one of a metal may also be added. The amount of the metal or metal oxide added may be up to and including 20 wt % of the metal oxide-noble metal mixture for each metal or metal oxide.

A second embodiment of the present invention is a novel class of RAB materials to provide superior performance over the prior art. In particular, this class of RAB material includes the combination of Ag, CuO, $Al_2O_3$ and $TiO_2$.

This embodiment of the present invention may be prepared by a high-energy ball milling (e.g. cryomilling) process, but need not be in order to form a composite powder mixture. The composite powder mixture can be further processed into a paste or slurry for subsequent brazing.

An embodiment of the present invention may also be prepared by rapid solidification or other processing methods to be processed into a foil, thin sheet, preform or other shape or manifestation for subsequent brazing applications. In one embodiment of the invention, a foil or a thin sheet may have a thickness within the range of 0.001 to 0.01 inches (0.025-0.25 mm) Furthermore, a foil or a thin sheet may not be completely uniform in thickness and may be of any shape or shapes within a range of thickness.

Another embodiment of the present invention is a method of brazing to produce desirable features in brazing. This method may comprise the steps of: providing a first part, providing a second part, providing a braze material between said first part and said second part, heating said first part, braze material and second part in air or an oxidizing atmosphere to a standard brazing temperature. The braze material may comprise a metal oxide-noble metal mixture and the first and second part may comprise a ceramic, or ceramic composite and a metal, or metal composite part but need not be. For example, the first or second parts may optionally be metal or metal composites, ceramic or ceramic composite, or of the same material such as a metal or metal composite or a ceramic or ceramic composite. Also, the braze material presents an advantage by working in an oxidizing atmosphere and being oxidization resistant but may also be used in a reducing atmosphere.

In this embodiment, the metal oxide-noble metal mixture in this embodiment may be selected from the group consisting of Ag—CuO, Ag—$V_2O_5$, and Pt—$Nb_2O_5$. Additives comprising an addition of at least one metal oxide, such as $TiO_2$, YSZ and $Al_2O_3$ or metal, such as Al and Pd may be added. As an exemplary embodiment, the amount of the metal or metal oxide added may be up to and including 20 wt % of the metal oxide-noble metal mixture for each metal or metal oxide. The invention particularly discloses a novel class of RAB composition that provides the best performance, namely a combination of Ag, CuO, $Al_2O_3$ and $TiO_2$.

This embodiment of the present invention may be prepared by a high-energy ball milling (e.g. cryomilling) process, but need not be. The purpose of using a high-energy ball milling process is to form a well-mixed composite powder that avoids the formation of a continuous brittle phase.

Various objects, features, aspects and advantages of the present invention will become more apparent from the following detailed description of preferred embodiments of the invention, along with the accompanying drawings in which like numerals represent like components.

DETAILED DESCRIPTION OF THE INVENTION

Figure 1:
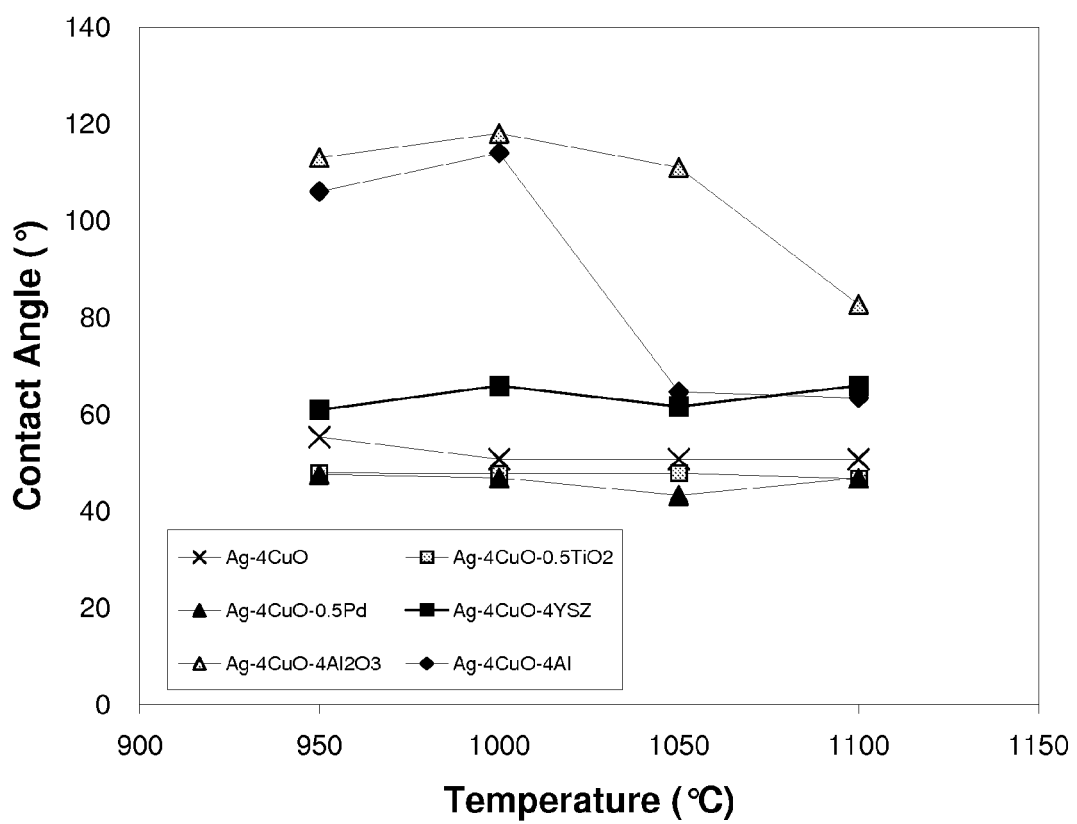
FIG. 1 is a graph showing the effects of elements $TiO_2$, Pd, YSZ, $Al_2O_3$, and Al on the contact angle of Ag—CuO based brazes on YSZ in air as a function of temperature in an experiment performed to demonstrate the present invention.

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Overview

The present invention generally relates to a braze, bond, seal or joint that is based on a noble metal matrix and an oxide compound that partially or fully dissolves in the noble metal solvent in a molten state, with additives comprising an addition of metal oxide and/or metal that will further improve wettability and bonding strength. Braze pellets may also be prepared by a high-energy ball milling process to form a finer size, more closely spaced dispersion of metal oxide particles. The braze may also be in the form of a foil, thin foil, sheet or other preform, shape or manifestation. This type of braze is particularly suitable for use in RAB, and is especially effective in sealing solid oxide fuel cells (SOFCs) and other solid-state electrochemical devices. The improved wettability and joint strength is due to embodiments of both novel brazing materials and methods of preparing a brazing compound.

DEFINITIONS

"Brazing" is defined herein as a joining process in which a brazing material is heated to a heating temperature above 450° C. The heating temperature will depend on the exact nature of the materials in question and is not necessarily construed to be only one temperature. In one embodiment, the braze material may be distributed between two or more close-fitting parts, or a first material and a second material by capillary action. In other embodiments, the braze material may be applied as a powder, paste, thin foil, thin sheet, sheet, cream, sludge or any other substance so long as it interacts between at least two parts or materials. The braze material is brought slightly above its melting (liquidus) temperature where it interacts with the two parts or materials and is then cooled rapidly to form a seal, joint or bond. Generally, but not necessarily, the melting temperature of the braze material is lower than the melting temperature of the parts or materials being sealed, joined or bonded. An advantage of this technology is that brazed seals, joints or bonds are generally stronger than the individual filler materials used due to the geometry of the seal, joint or bond as well as to the chemistry or type of bonding that occurs.

An "oxidizing" atmosphere is defined as a gaseous atmosphere in which an oxidation reaction occurs. "Air" is used as the colloquial term to indicate an oxidizing atmosphere. A "reducing" atmosphere is an atmospheric condition in which oxidation is prevented due to the removal of oxygen and other oxidizing gases or vapors.

"Metallic" is defined as being composed of some or entirely of a metal.

A "composite" is a material made up of various components. For example, a metal composite will comprise a metal and possibly some other components that either may not be metal or may be a different type of metal but together make up a metal composite material. On a related matter, a reference to a single material refers to a material comprising a single type of that material or a material comprising a number of different versions or types of that material. For example, a metal may be of a single type of metal only or comprised of various types of metals.

The term "between" is construed as somewhere in the space defined by at least two outer parts, materials or objects. For example, a braze material between a first material and a second material may touch both materials, or only touch one material or touch neither material.

A "metal oxide-noble metal mixture" is a mixture of at least one noble metal and at least one metal oxide. The mixture may be a combination of different noble metals and different metal oxides.

An "additive" is defined as an addition to a mixture or a material. For example, a metal oxide-noble metal mixture may consist of a noble metal and a metal oxide such as Ag—CuO. If the braze material comprises at least one metal oxide-noble metal mixture and at least one additive the material would comprise Ag, Cuo and $Al_2O_3$ if the additive was only one additive of metal oxide, where the additive by example here is $Al_2O_3$. Likewise, the material would comprise Ag, Cuo, $Al_2O_3$, and $TiO_2$ if there were two additives of metal oxide, if the additives by example here is $Al_2O$ and $TiO_2$. Also, the material would comprise Ag, Cuo, $Al_2O_3$ and Al if there were two additives of one metal oxide (which by example here is $Al_2O_3$) and one metal (which by example here is Al). In yet another example, the brazing material may comprise Ag, Cuo, $Al_2O_3$, $TiO_2$, Al and Pd if there were four additives of two metal oxides (which by example here is $Al_2O_3$ and $TiO_2$) and two metals (which by example here is Al and Pd). The term "at least one" is construed to mean at least one selected from a group but may mean only one selected or many be several selected from the group.

Furthermore, the "braze material" may be manifested as any combination of at least one of the same or at least one different material, element, compound, particle, powder, paste, film, sheet, thin foil, thin sheet, alloy, cream, sludge or any embodiment of a material or materials used in brazing. These manifestations or forms of the braze material may occur after the braze material is place between the at least two parts, materials or objects to be brazed and prior to the actual heating and melting of the braze material. Also, these manifestations and forms of the braze material may relate to the nature in which the braze material may react with its constituent parts or other materials or surfaces in the brazing process. For example, the usage of at least one metal oxide-noble metal mixture no matter the form it is manifested, for example a sheet, if used in combination of an additive in the form of a powder will still constitute the braze material. The braze material is not limited in the way that the individual components of the braze material interact or are manifested so long as the individual components are present.

"Rapid Solidification" is a technique in which rapidly solidified materials are cast into powder or particulate forms and then processed into three dimensional products.

The composition of the braze material may comprise whatever amount is necessary to ensure that the mixture is a combination of both a noble metal and a metal oxide. As for the additive that may be added to a noble metal-metal oxide mixture, for example, a composition may consist of 40 wt % of a single metal oxide or 40 wt % of two metal oxides each.

Also, the amount of an individual metal oxide or metal may be as small as 0.5 wt %, 1 wt %, 5 wt %, preferably 10 wt %, 15 wt %, more preferably 20 wt %, 25 wt %, 30 wt % or 35 wt %. It may also be of a larger quantity. These numbers are used as an exemplary indication of respective embodiments of the invention only and are not construed to limit the invention in any way.

"High-energy ball milling" is defined as ball milling with high energy. High-energy ball milling differs from traditional ball milling in that traditional ball milling merely mixes while high-energy ball milling both mixes and creates a new compound from a number of initial compounds. The ball milling is of sufficiently high energy that a new and finer material is created. For example, the ball milling of Ag and CuO powders would merely mix the powders together. High-energy ball milling of the compound would yield a whole new Ag—CuO compound that is bonded together and whose powder is of a finer grade than before.

"Cryomilling" is defined as high-energy ball milling at very low temperatures, typically in a bath of liquid nitrogen or around −165° C. This process essentially cold-works the particles. The cold-working introduces numerous dislocations, which form sub grain boundaries, and eventually high-angle grain boundaries with grain sizes on the order of nanometers. During cryomilling the grain size of the material does not decrease indefinitely. Eventually the grain size of the material reaches an equilibrium state after which no amount of cold working will decrease the grain size of the material below the equilibrium grain size. Equilibrium grain diameters as small as approximately $2.5 \times 10^{-8}$ have been observed via electron microscopy and measured by x-ray diffraction at this stage in processing (see for instance U.S. Pat. No. 7,344,675, which is incorporated by reference herein). As will be discussed, in contrast to traditional ball milling, high-energy cryogenic ball milling specifically shows improvement over the prior art by reducing the formation of a thick continuous oxide phase along the interface that would degrade the joint strength. Hence, this process facilitates the formation of CuO or mixed oxide as a discrete phase along these interfaces would simultaneously increase the wettability and joint strength.

ADVANTAGES OF THE INVENTION

The described versions of the present invention have many advantages, including better wettability, joint strength, the reduction or avoidance of the formation of a thick continuous oxide phase along the interface, the facilitation of a discrete phase along the interface of the braze material. Another advantage of an embodiment of the present invention allows the braze to form at a finer size, thereby allowing more evenly dispersed metal oxide particles in the resultant braze layer between on the surface of the ceramic substrate and metallic parts. Due to these advantages, this invention leads to high-strength bonding unattainable by currently available technology.

The prior art has tried to create a superior braze material with good wettability and joint strength, among the other advantages listed here. However, the prior art has failed in this regard as demonstrated by the advantages incumbent in several embodiments of the present invention.

Furthermore, the invention does not require that all the advantageous features and all the advantages need to be incorporated into every embodiment of the invention. Also, this partial list of advantages is not an exhaustive list or description of all of the advantages from the embodiments and versions of the present invention.

SPECIFIC EMBODIMENTS AND EXAMPLES

RAB has been recognized a promising method of sealing the ceramic membranes and metallic structural components used in gas separation devices and SOFCs. Previous investigations on brazes used in RAB, such as the Ag—CuO system, have however shown that the use of eutectic or near-eutectic composition of Ag—CuO systems oftentimes does not form a homogeneous joining microstructure. Also, the Ag—CuO system is prone to generate a continuous phase of CuO either within the interior of the braze, or along the braze interface that would result in an inferior strength of the joint.

An embodiment of the invention incorporates 5 additional elements to a standard braze. These five additional elements in this example are $TiO_2$, Pd, $Al_2O_3$, YSZ, and Al along with combinations of these elements. A complete composition design is shown in Table 1, which shows fourteen compositions in total. The effects of individual elements (or compounds) are also summarized in Table 1. $TiO_2$ is used as an exemplary wetting agent to improve Ag—CuO's wetting characteristics because the CuO—$TiO_2$ binary system exhibits a eutectic reaction at lower temperatures with a wide compositional range. The addition of Pd increases the bonding strength along with the use temperature of the sealant as well. Additionally, the addition of YSZ or $Al_2O_3$ into Ag—CuO system improves adhesion and joint strength, while adding Al improves joint strength and slightly reduces the processing temperatures.

TABLE 1

Exemplary compositions of RAB in the invention

| Braze ID | Composition (mole %) | Notes |
|---|---|---|
| 1 | Ag—4CuO | "Standard" air braze formulation |
| 2 | Ag—4CuO—½$TiO_2$ | $TiO_2$ to improve wetting |
| 3 | Ag—4CuO—½Pd | Pd to improve bonding strength, increase use temperature |
| 4 | Ag—4CuO—½Pd—½$TiO_2$ | Combined effects of Pd and $TiO_2$ |
| 5 | Ag—4CuO—4YSZ | YSZ to improve adhesion and joint strength |
| 6 | Ag—4CuO—4YSZ—½$TiO_2$ | Combined effects of YSZ and $TiO_2$ |
| 7 | Ag—4CuO—4$Al_2O_3$ | $Al_2O_3$ to improve joint strength |
| 8 | Ag—4CuO—4$Al_2O_3$—½$TiO_2$ | Combined effects of $Al_2O_3$ and $TiO_2$ |
| 9 | Ag—4CuO—4Al | Al improve joint strength |
| 10 | Ag—4CuO—4Al—½$TiO_2$ | Combined effects of Al and $TiO_2$ |

While Ag—CuO system was selected as an exemplary braze to provide proof of the utility of the present invention, it will be apparent to those having ordinary skill in the art that the methods and materials of the present invention would be expected to perform in a similar manner with other brazes used in RAB, and the selection of Ag—CuO system for these experiments should in no way be construed as limiting the applicability of the present invention to this particular example of the braze.

These different braze compositions were fabricated by dry mixing the appropriate amounts of individual elementary powders. The raw materials used include: 1) silver (99.9%, 5.5 μm average particle diameter; Alfa Aesar), 2) copper (99%, 2.5 μm average particle diameter; Alfa Aesar), 3) titanium dioxide powders (>99.9%, 325 mesh, Coastal Scents); 4) palladium powder (>99.9%, 7.5 average particles diameter, Aldrich); 5) YSZ (>99.9%, MTI Corporation; 6) $Al_2O_3$ (99.9%, 325 Mesh Alfa Aesar), and 7) Al (99.9%, 325 Mesh, Atlantic Equipment Engineers).

In demonstrating an embodiment of the invention, a high-energy cryogenic ball milling process in liquid nitrogen ($LN_2$) media, or "cryomilling" process, was used in preparing the filler brazing powder. The application of this kind of high-energy ball milling process in this embodiment of the invention forms a finer size, more closely spaced dispersion of CuO particles that will nucleate on the interface braze layer during the brazing process. However, in contrast to traditional ball milling, high-energy cryogenic ball milling specifically shows improvement over the prior art by reducing the formation of a thick continuous oxide phase along the interface that would degrade the joint strength. Hence, this process facilitates the formation of CuO or mixed oxide as a discrete phase along these interfaces would simultaneously increase the wettability and joint strength.

A mixture of each component powder according to Table 1 was cryomilled with a small-scale attritor (1 pound powder). The milling vessel contained 0.250 in. YSZ ceramic ball bearings (the ratio of ball bearings vs. powder mixture is generally 30:1 and the processing is performed at around $-165°$ C.). A multi-appendage paddle stirred the ball bearings. During the cryomilling process, the starting powder became impinged between ball bearings and fractures into sub-micron or nano-sized particles which then cold-joins into coarser agglomerates. The fracturing and re-welding process was repeated continuously throughout the milling cycle (generally 8-12 hrs). At the completion of the cryomilling, the powder/$LN_2$ slurry was poured from the bottom of the attritor and the $LN_2$ was allowed to boil off. The resultant powders were then mixed with a polymer binder (Heraeus V-006, Heraeus Inc.) in a ratio of 15 wt % binder to 85 wt % powder mixture to produce the fill metal paste.

Wetting experiments were conducted by the standard sessile drop technique. Each filler metal pellet was placed on a polished YSZ substrate and heated through a series of temperatures above the point at which the pellet becomes molten. Changes in the braze droplet's base diameter, height, and angle of contact with the substrate were monitored. The YSZ substrates were made by press-assisted sintering of YSZ powder (TZ-8Y, Tosoh Corp. Advanced Ceramics Department, Tokyo Japan) to form a disk (about 2.5 inch in diameter and 0.2 inch in thickness) with a density of 99.8% theoretical density of 8 mol % yttria-stabilized zirconia. Prior to the sessile drop test, the contact surface of each substrate was polished in several sequential steps: 45 and 15 nm diamond wheel polishing followed polishing by 9, 3, and 1 μm diamond suspensions on appropriate pads (Allied High Tech). The disks were then cleaned with acetone, rinsed with propanol, air dried, and heated in static air to 600° C. for four hours to burn off any residual organic species. The sessile drop experiments were conducted in a static air muffle furnace outfitted with a sapphire window through which the contact angle of the heated specimen could be recorded. Each braze pellet was placed on the polished face of a substrate and heated using a schedule that consisted of 10° C./min to an initial temperature of 900° C. and equilibrated for 15 min, then subsequently heated at 10° C./min to soak temperatures of 950° C., 1000° C., 1050° C., and 1100° C., each of which was held constant for a period of 15 min. After the final soak duration the furnace was cooled at 20° C./min to room temperature. A digital camera (Cannon Digital Rebel) with a zoom lens with capturing software was used to obtain digital images of the profile of the braze pellets throughout the heating cycle. The temperature was recorded using a thermocouple that was placed within one inch of the sample. The temperature signal was logged using a computer that also recorded the images at an interval of one picture every minute. The contact angle between the braze filler metal and YSZ substrate was measured from the images and correlated with the temperature log for each heating run.

Samples 1-4 formed a wetting drop shape. Table 2 lists the contact angles for the silver rich phase, although a very thin layer did extend beyond these samples forming a "halo" around the silver rich drop. The "halo" generally consists of the copper oxide rich liquid with either the $TiO_2$ or other additional elements. In addition, samples 1, 3, and 4 exhibited signs of a particulate (possibly the impurities) that did not dissolve into the drop until relatively high temperatures. Sample 2 exhibits a good wetting without a non-dissolved particulate.

Samples 5-10 showed two different wetting behaviors. These samples tended to retain the shape of the pressed pellet in some way. This shape appears to be due to the particulate materials that may be held together by a portion of the Ag—CuO liquid, thus forming a shell. For some of the samples the Ag—CuO liquid was able to separate from the shell. For samples 6 and 8 the liquid appeared to remain within the structure and therefore appears the most homogeneous. Table 2 summarizes the results of these wetting experiments.

TABLE 2

Summary of wetting experiment results

| | | Wetting angle θ (°) | | | |
|---|---|---|---|---|---|
| Braze ID | Composition (mole %) | 950° C. | 1000° C. | 1050° C. | 1100° C. |
| 1 | Ag—4CuO | 55.3 | 50.8 | 50.8 | 50.8 |
| 2 | Ag—4CuO—½$TiO_2$ | 47.9 | 47.7 | 47.8 | 46.8 |
| 3 | Ag—4CuO—½Pd | 47.6 | 46.9 | 43.3 | 46.8 |
| 4 | Ag—4CuO—½Pd—½$TiO_2$ | 66.9 | 58.2 | 44.2 | 50.8 |
| 5 | Ag—4CuO—4YSZ | 60.9 | 65.9 | 61.6 | 65.9 |
| 6 | Ag—4CuO—4YSZ—½$TiO_2$ | 94.9 | 61.0 | 54.3 | 53.1 |
| 7 | Ag—4CuO—4$Al_2O_3$ | 113.0 | 118.0 | 111.0 | 82.7 |
| 8 | Ag—4CuO—4$Al_2O_3$—½$TiO_2$ | 91.6 | 97.7 | 94.7 | 61.5 |
| 9 | Ag—4CuO—4Al | 106.0 | 114.0 | 64.6 | 63.4 |
| 10 | Ag—4CuO—4Al—½$TiO_2$ | 66.6 | 64.7 | 64.3 | 57.8 |

Another set of experiments were conducted to further demonstrate the advantages and operation of an embodiment of the present invention under the effects of additional elements $TiO_2$, Pd, YSZ, $Al_2O_3$, and Al in the Ag-4CuO system using data in Table 2. It was found that $TiO_2$ reduces the wetting angle as expected, and Pd also slightly reduces the wetting angle, while the introduction of YSZ, Al and $Al_2O_3$ all increased the wetting angles, and which the introduction of $Al_2O_3$ provided the greatest increase in the wetting angle (FIG. 1).

Figure 2:
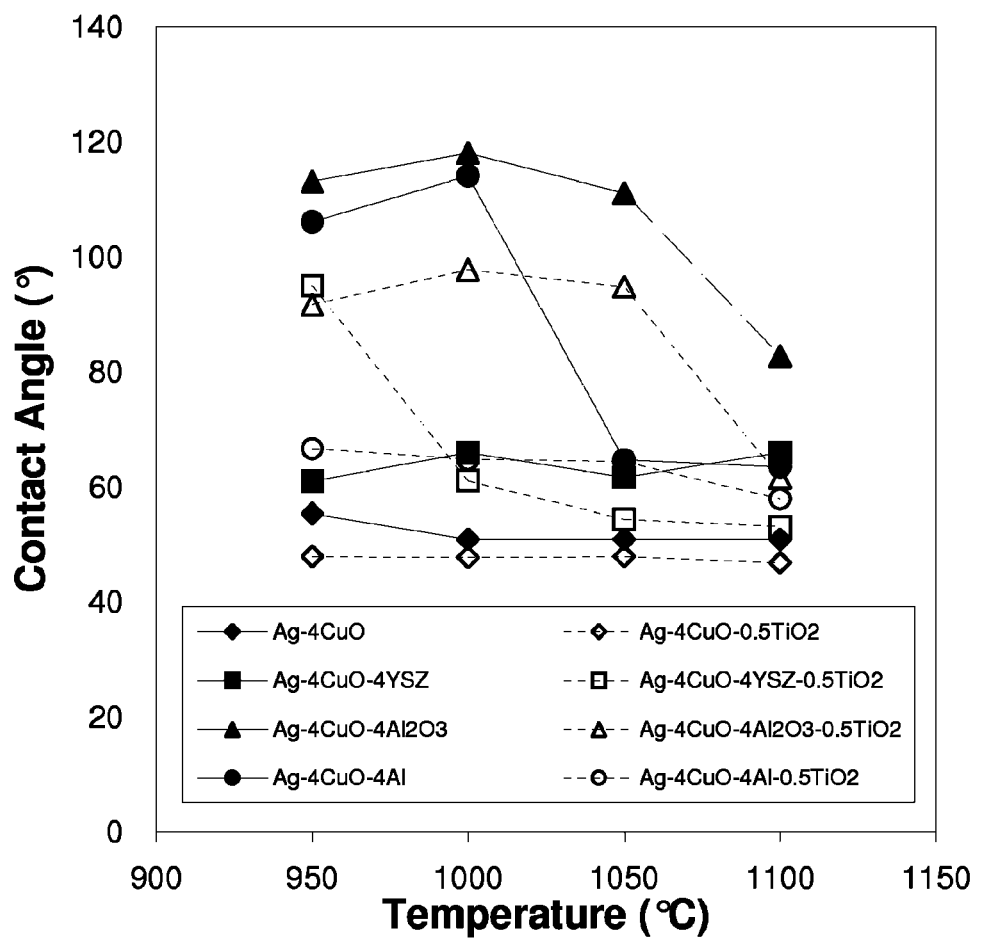
FIG. 2 is a graph showing the effects of $TiO_2$ on the contact angle of Ag-4CuO—X brazes (X=YSZ, $Al_2O_3$, Al respectively) on YSZ in air as a function of temperature in an experiment performed to demonstrate the present invention.

Another set of experiments demonstrating an embodiment of the invention focused on the combined effects of $TiO_2$ (to reduce the wetting angle) and other elements of YSZ, Al and $Al_2O_3$ (to increasing strength). In FIG. 2, it was found that the integration of TiO2 into the filler compositions containing YSZ (Braze ID #6), Al2O3 (Braze ID #8), and Al (Braze ID #10) respectively all causes a significant reduction in wetting angle particularly for $Al_2O_3$ and Al. One exception for Braze ID #6 at 950° C. may be due to the partial melting at this temperature.

Based on previous investigations, all the compositions show good wetting conditions upon the addition of $TiO_2$ as a wetting-enhancement agent although some show smaller wetting angles than others.

Microstructure analysis of some typical wetting samples, including Sample 1, 2, 6 and 8, was performed with Scanning Electron Microscopy (SEM, Jeol JSM-5900 LV). As for SEM sample preparation, the samples were encased in epoxy and sectioned with a diamond saw. The cross section was polished to 1.0 μm using diamond pads and suspensions, and then coated with Au—Pd to avoid charging.

Figure 3:
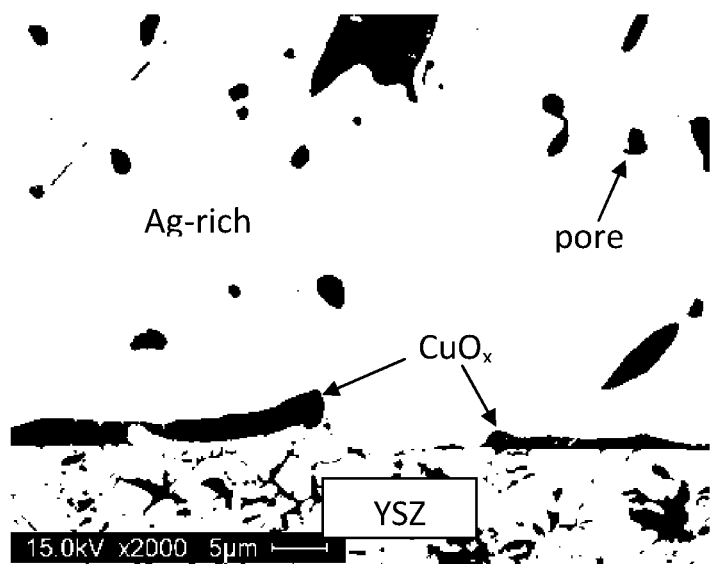
FIG. 3 is a series of SEM micrographs showing a cross section of braze/YSZ interfaces created in an experiment performed to demonstrate the present invention: (a) Ag-4CuO, (b) Ag-4CuO-½$TiO_2$. Each wetting specimen was heated in air at a final soak temperature of 1100° C.
Figure 3:
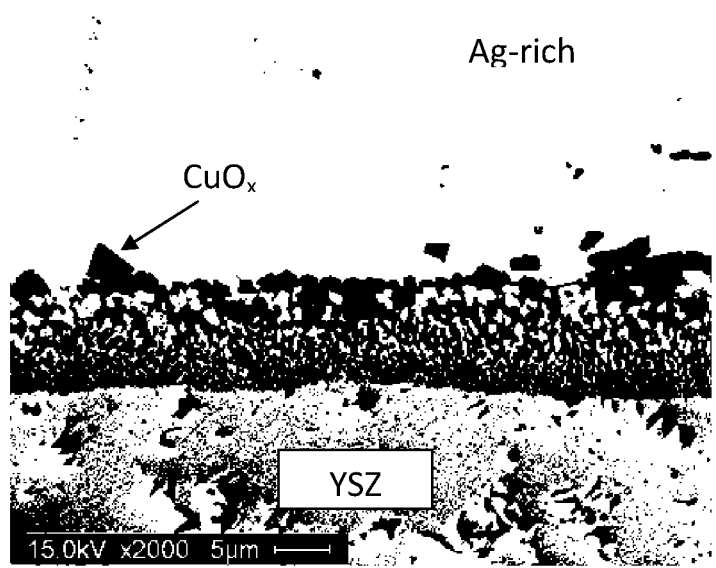
Figure 4:
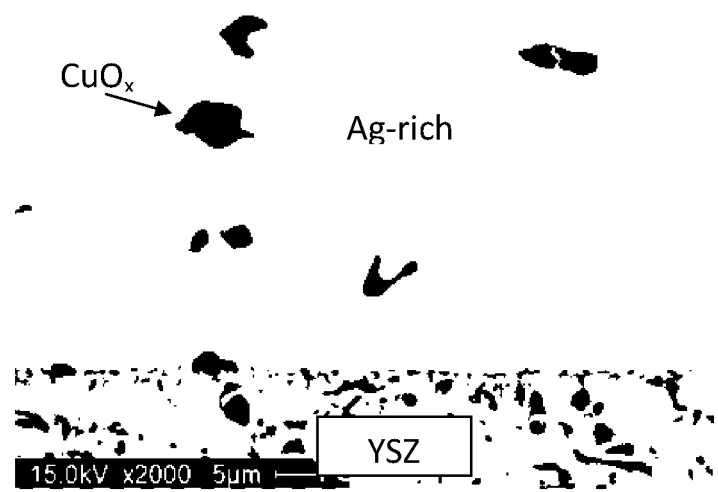
FIG. 4 is a series of SEM micrographs showing a cross section of braze/YSZ interfaces created in an experiment performed to demonstrate the present invention: (a) Ag-4CuO-4YSZ-½$TiO_2$, and (b) Ag-4CuO-4$Al_2O_3$-½$TiO_2$. Each wetting specimen was heated in air at a final soak temperature of 1100° C.
Figure 4:
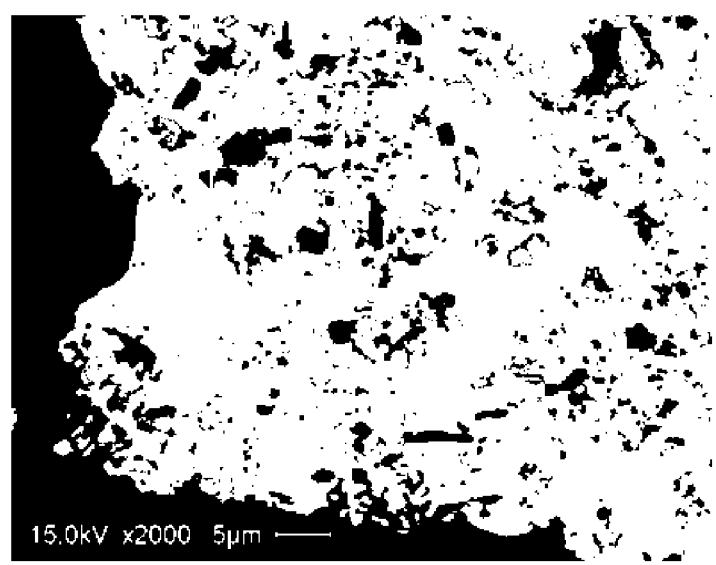

The SEM images of wetting sample 1, 2, 6 and 8 at drop center are shown in FIG. 3 and in FIG. 4. Good wetting contact of braze alloy and YSZ substrate is observed for all 4 samples in FIG. 3 and in FIG. 4. Also, it can be found that braze alloy consists of Ag-rich matrix with CuOx (mixture of CuO—$Cu_2O$) precipitates. The interfacial products due to the reaction between Ti and YSZ can be found at the interface for sample 2 (FIG. 3(b)). For sample 6 and 8, large amount of internal pores are found in the braze (FIGS. 4(a) and 4(b) respectively).

The four-point bend technique was employed as a means of measuring joint strength of bar specimens of the YSZ/YSZ brazing assembly. The AWS C3.2M/C3.2:2001 test standard was followed to ensure that the results could be unequivocally and easily reproduced by one of ordinary skilled in the art.

Four-point bend experiments were conducted on representative samples 6 and 8, which are the joined YSZ/YSZ assemblies using brazing compositions of 6 and 8 as listed in Table 1. For each sample of YSZ/YSZ assembly, 5 pieces specimens were cut and tested. The results are summarized in Table 3.

As shown from these preliminary data in Table 3, under the same brazing conditions, the addition of 4 mol. % $Al_2O_3$ into Ag-4CuO-½$TiO_2$ to form Ag-4CuO-4$Al_2O_3$-½$TiO_2$ (Sample 8) exhibits higher bending strength (more than twice) as compared with that with the addition of 4 mol. % YSZ to Ag-4CuO-½$TiO_2$ (Sample 6). Apparently, the effect of $Al_2O_3$ on strength enhancement is more significant than YSZ. However, sample 8 (95.9 MPa) does not exhibit the strength improvement as expected since it is lower than the largest strength of Ag4CuO0.5$TiO_2$, of around 121 MPa, as reported by other researchers (for example in Kim JYY, J S Hardy, and K S Weil. 2005. "Novel Metal-Ceramic Joining for Planar SOFCs" Journal of the Electrochemical Society 152(6):J52-J58). The unsatisfied material strength may be primarily attributed to the presence of pores, whose microstructure may be investigated by a Scanning Electron Microscope. With the minimization or even elimination of porosity, a much enhanced bonding strength is expected.

Another experiment was conducted to demonstrate another embodiment of the present invention as an ideal composition, namely Ag-8CuO-10$Al_2O_3$-½$TiO_2$ (indicated as sample 11) to further illustrate the effect of $Al_2O_3$ on joint strength. As shown in Table 3, the strength of YSZ brazing sample using Ag-8CuO-10$Al_2O_3$-½$TiO_2$ is about 128 MPa. Therefore, the increased strength from Sample 8 to 11 can be attributed to the increase of $Al_2O_3$ from 4 mol % to 10 mol %. Note that the strength of sample 11 is even higher than the best data point of around 121 MPa, as reported by other researchers (for example in Kim JYY, J S Hardy, and K S Weil. 2005. "Novel Metal-Ceramic Joining for Planar SOFCs" Journal of the Electrochemical Society 152(6):J52-J58). Thereby, a novel class of braze material or composition comprised of Ag, CuO, $Al_2O_3$, $TiO_2$ is created, namely Ag-8CuO-10$Al_2O_3$-½$TiO_2$.

TABLE 3

Summary of four-point bend experiments results for Samples 6, 8 and 11

| Sample | Specimen | Width (mm) | Thickness (mm) | Peak Load (N) | Bend Strength (MPa) | AVG (MPa) | STD (MPa) |
|---|---|---|---|---|---|---|---|
| 6<br>Ag4CuO-<br>4YSZ-½<br>TiO$_2$ | 1 | 4.1 | 3.3 | 11.0 | 32.6 | 42.3 | 11.1 |
|  | 2 | 4.1 | 3.0 | 10.6 | 37.5 |  |  |
|  | 3 | 4.0 | 2.9 | 8.4 | 33.7 |  |  |
|  | 4 | 4.1 | 3.0 | 16.4 | 58.0 |  |  |
|  | 5 | 4.1 | 3.1 | 14.5 | 49.6 |  |  |
| 8<br>Ag4CuO-<br>4 Al$_2$O$_3$-<br>½TiO$_2$ | 1 | 4.0 | 3.2 | 24.2 | 76.8 | 95.9 | 16.5 |
|  | 2 | 4.0 | 3.3 | 34.9 | 109.1 |  |  |
|  | 3 | 4.0 | 3.1 | 25.2 | 86.7 |  |  |
|  | 4 | 4.0 | 2.8 | 27.6 | 116.8 |  |  |
|  | 5 | 4.0 | 3.3 | 28.8 | 90.0 |  |  |
| 11<br>Ag8CuO-<br>10 Al$_2$O$_3$-<br>½TiO$_2$ | 1 | 4.0 | 3.0 | 50.0 | 183.9 | 128.2 | 48.8 |
|  | 2 | 4.1 | 3.3 | 42.0 | 124.6 |  |  |
|  | 3 | 4.0 | 3.0 | 35.5 | 126.3 |  |  |
|  | 4 | 4.1 | 3.1 | 45.0 | 153.9 |  |  |
|  | 5 | 4.1 | 3.5 | 19.6 | 52.4 |  |  |

Based on these results, Al$_2$O$_3$ can be identified as an effective agent to improve the joint strength of both Ag-4CuO and Ag-8CuO-based RAB systems (braze). Moreover, the composition of Sample 11, Ag-8CuO-10Al$_2$O$_3$-½TiO$_2$ exhibits the best strength. Combining the results of wetting experiments in previous sections, it was found that the braze composition that contains Ag, CuO, Al$_2$O$_3$, and TiO$_2$ exhibits both high bending strength and a good wetting condition that is beneficial to form a sound microstructure.

CONCLUSION, RAMIFICATIONS, AND SCOPE

Many alterations and modifications may be made by those having ordinary skill in the art without departing from the spirit and scope of the invention. It is expressly understood that the invention as defined by the claims may be broader than the illustrated embodiments described herein. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Any element in a claim that does not explicitly state "means for" performing a specified function, or "step for" performing a specific function, is not to be interpreted as a "means" or "step" clause as specified in 35 U.S.C. §112, ¶ 6. In particular, the use of "step of" in the claims herein is not intended to invoke the provisions of 35 U.S.C. §112, ¶ 6.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

A series of experiments were conducted in accordance with the methods of the present invention thereby forming the joints, or seals, of the present invention. While these experiments are useful to demonstrate certain features and aspects of the present invention, they should in no way be interpreted as an exhaustive demonstration of all of the various aspects of the invention. As will be recognized by those having skill in the art, many of the advantages of the present invention can readily be achieved with significant variations from the experiments described herein, including, without limitation, the selection of the materials, and the methods and operating parameters used to combine those materials. Accordingly, the present invention should be broadly construed to include all such modifications and equivalents thereto that are encompassed by the appended claims.

It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C and N, the text should be interpreted as requiring only one element from the group, not A plus N, or B plus N, etc.

What is claimed is:

1. A method of brazing, said method comprising the steps of:
   a) providing a first part, said first part may be metallic or ceramic or a metallic composite or a ceramic composite;
   b) providing a second part, said second part may be metallic or ceramic or a metallic composite or a ceramic composite;
   c) providing a braze material between said first part and said second part, said braze material comprises:

i. at least one metal oxide-noble metal mixture selected from
   1. Ag—CuO,
   2. Ag—V$_2$O$_5$, and
   3. Pt—Nb$_2$O$_5$;
ii. and at least one additive selected from
   1. at least one metal oxide selected from the group consisting of
      a. TiO$_2$,
      b. YSZ, and
      c. Al$_2$O$_3$;
   2. and at least one metal selected from the group consisting of
      a. Al, and
      b. Pd,
d) preparing the braze material by a high-energy ball milling process wherein the metal-oxide noble metal mixture is formed by high-energy ball milling a noble metal and a metal oxide to yield a metal oxide-noble metal compound;
e) and heating said first part, said braze material and said second part in an oxidizing atmosphere.

2. The method of claim 1, wherein of said additive to the braze material, each said metal or said metal oxide comprises up to and including 20 wt % of said braze material.

3. The method of claim 2, wherein said braze material is comprised of Ag—CuO, Al$_2$O$_3$ and TiO$_2$.

4. The method of claim 3, wherein said braze material is Ag-8CuO-10Al$_2$O$_3$-½TiO$_2$.

5. The method of claim 1, wherein said at least one metal oxide-noble metal mixture comprises Ag—V$_2$O$_5$.

6. The method of claim 4, wherein said high-energy ball milling process is a cryomilling process.

7. The method of claim 4, wherein said braze material is in the form of either a powder or a paste.

8. The method of claim 4, wherein said braze material is in the form of either a foil or a thin sheet.

9. The method of claim 1, wherein said at least one metal oxide-noble metal mixture comprises Pt—Nb$_2$O$_5$.

10. The method of claim 1, wherein said high-energy ball milling process is a cryomilling process.

11. The method of claim 1, wherein said braze material is in the form of either a powder or a paste.

12. The method of claim 1, wherein said braze material is in the form of either a foil or a thin sheet.

* * * * *